United States Patent [19]

Piper

[11] 4,114,644
[45] Sep. 19, 1978

[54] RECYCLING DRAIN PAN

[76] Inventor: Eldon L. Piper, 1525 West La., Billings, Mont. 59101

[21] Appl. No.: 766,720

[22] Filed: Feb. 8, 1977

[51] Int. Cl.$^2$ .............................................. F04F 11/00
[52] U.S. Cl. ................................ 137/565; 137/355.16; 220/1 C
[58] Field of Search ............................ 137/355.16, 565; 123/41.14, 198 DA; 184/1.5, 106; 220/1 C

[56] References Cited

U.S. PATENT DOCUMENTS

| Re. 27,449 | 8/1972 | Bartz | 220/1 C X |
| 1,554,589 | 9/1925 | Long | 220/1 C |
| 1,584,175 | 5/1926 | Irons | 220/1 C |
| 1,802,426 | 4/1931 | Hoyt | 220/1 C |
| 3,743,053 | 7/1973 | Kuklewicz | 184/1.5 |
| 3,810,487 | 5/1974 | Cable et al. | 184/1.5 X |
| 4,010,863 | 3/1977 | Ebel | 220/1 C |

FOREIGN PATENT DOCUMENTS 1,432,610  4/1976  United Kingdom ..................... 137/565

Primary Examiner—Gerald A. Michalsky

[57] ABSTRACT

A drain pan forming an enclosure having a top and bottom wall and a front wall and terminates in a drain opening into the enclosure at the juncture of the front wall and top wall so that anti-freeze from an automotive radiator may be drained onto the front wall and through the drain opening into the interior of the enclosure. A sump pump is mounted in the interior of the enclosure for recycling the collected anti-freeze fluid through a flexible hose connected to the outlet of the pump back into the radiator.

6 Claims, 3 Drawing Figures

RECYCLING DRAIN PAN

PRIOR ART

The following patents are considered pertinent:
U.S. Pat. No. 172,341
U.S. Pat. No. 1,506,028
U.S. Pat. No. 1,554,589
U.S. Pat. No. 1,568,830
U.S. Pat. No. 1,802,426
U.S. Pat. No. 3,410,438

BACKGROUND OF THE INVENTION

This invention relates to a drain pan for use in catching fluid, such as anti-freeze, from the radiator of an automotive vehicle, and for recycling the fluid back to the radiator.

Often times, anti-freeze must be removed from the radiator of an automobile vehicle so that suitable repairs can be made on the radiator or merely to test the anti-freeze content of the fluid removed from the radiator. Once such repairs are made, in order to avoid the necessity of purchasing a new quantity of anti-freeze, the anti-freeze is caught in a pan and when the repairs to the radiator are accomplished, the anti-freeze is returned to the radiator. This is usually a laborious task and much of the anti-freeze is wasted in the return as insufficient safeguards are provided on the drain pan to preclude splashing and spillage of the anti-freeze from the pan as it is being returned to the radiator. Accordingly, this invention relates to a drain pan for automatically recycling fluid such as anti-freeze to a radiator without any loss of the anti-freeze.

SUMMARY OF THE INVENTION

In accordance with the invention, the drain pan includes a substantially rectangular parallelopiped enclosure provided with a sloping front wall which is positioned beneath a drain plug of a radiator. Anti-freeze removed from the radiator flows along the sloping front wall through a drain hole covered with a filter screen at one end of the wall so that the anti-freeze is collected within the interior of the enclosure. A sump pump is provided in the interior of the enclosure connected to a fluid return hose. The enclosure is merely placed in an upright condition and the fluid return hose clipped to the radiator. The sump pump is then activated to pump the collected fluid back into the radiator.

BRIEF DESCRIPTION OF THE DRAWING

Further objects and advantages of the invention will become apparent from the following description and Claims, and from the accompanying drawing, wherein:

DETAILED DESCRIPTION OF THE PREFERRED EMBODIMENT

Figure 1:
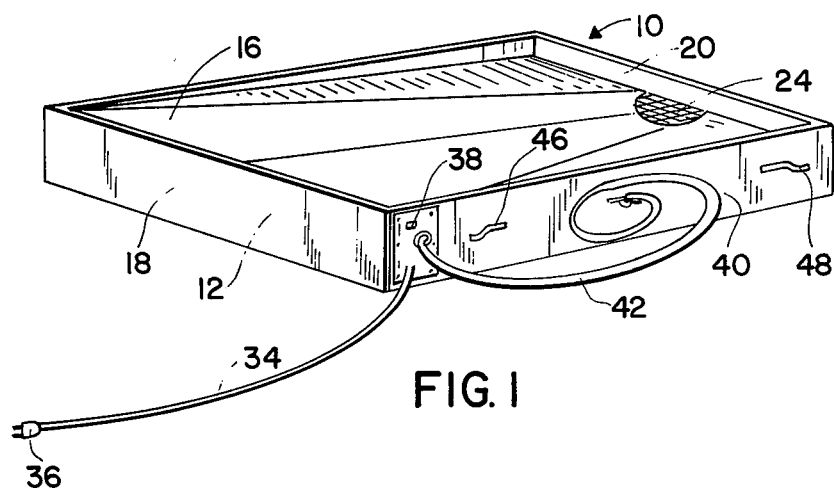
FIG. 1 is a perspective view of the drain pan of the present invention.
Figure 2:
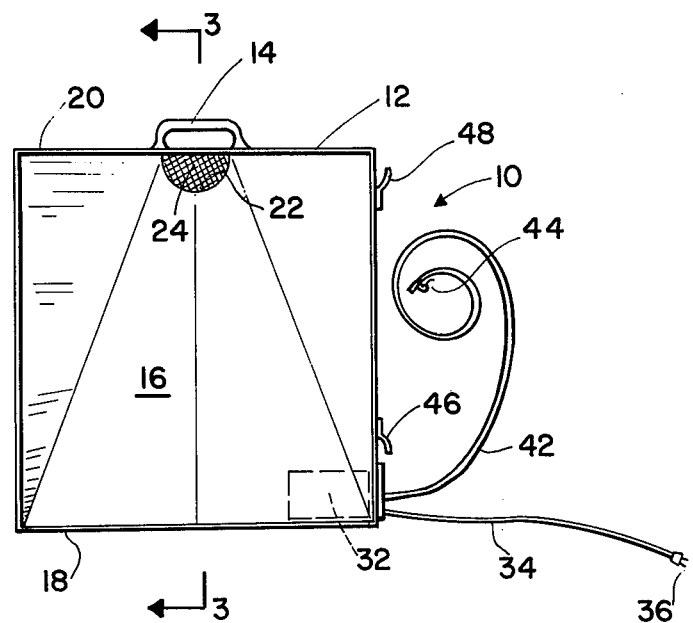
FIG. 2 is a top plan view of the drain pan of FIG. 1.

Referring now to the drawing in detail, wherein like numerals indicate like elements throughout the several views, the drain pan 10 of the present invention includes a substantially rectangular parallelopiped enclosure 12 having a carrying handle 14 on a top wall 20 thereof and a front wall 16 which slopes downwardly from a bottom wall 18 to the top wall 20.

Figure 3:
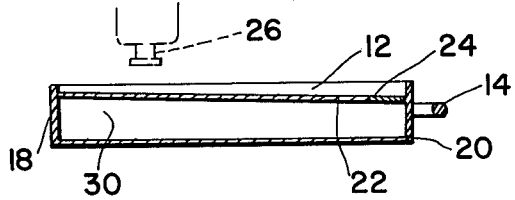
FIG. 3 is a cross sectional view taken substantially along the plane indicated by line 3—3 of FIG. 2 and illustrating the manner of use of the drain pan in collecting anti-freeze fluid from the radiator of an automotive vehicle.

Sloping front wall 16 has a drain opening 22 adjacent to top wall 20 which is covered with a replaceable filter screen 24. As shown in FIG. 3, drain pan 10 is used by placing the sloping front wall 16 beneath the drain plug 26 of an automobile radiator 28 and allowing anti-freeze to run down the sloping front wall 16 through filter screen 24 and opening 22 into the interior chamber 30 of pan 10.

After suitable repairs are made on radiator 28, the anti-freeze accumulated within the interior chamber 30 of drain pan 10 may be recycled to the radiator. In order to accomplish this objective, a sump pump 32 is provided within the interior chamber 30 of pan 10.

Power for the pump is obtained through an electric cord 34 connected to a pump motor. Cord 34 has an electric plug 36 which is attachable to a standard source of AC power and the pump motor is controlled by a switch 38 mounted on a side wall 40 of drain pan 10.

A flexible fluid return hose 42 is connected to the outlet of the sump pump 32 and terminates in the spring clamp 44 which can be clipped to the opening to radiator 28. Upon operation of pump 32, anti-freeze will be pumped from the interior of drain pan 10, which is turned to an upright position and supported on bottom wall 18, back into the interior of the radiator through flexible hose 42. When not in use, flexible hose 42 may be retained on a pair of spaced mounting brackets 46 and 48 on the side wall 40 of drain pan 10.

While a specific embodiment of a recycling drain pan has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A self-contained recycling drain unit comprising: a hollow enclosure having relatively narrow top, bottom and side walls, and a front wall extending between said walls which slopes downwardly from said bottom wall towards said top wall, a drain opening in said front wall adjacent said top wall, pump means forming an integral part of said unit having an outlet adjacent said bottom wall, and a flexible hose having one end connected to the outlet of said pump means and a free end for recycling fluid accumulated within said enclosure.

2. The drain pan of claim 1 including a filter screen over said drain opening.

3. A drain pan in accordance with claim 1 including a spring clip on the free end of said flexible hose.

4. The drain pan of claim 1 including power supply means connected to said pump means.

5. The drain pan of claim 1 including a handle fixed to the top wall of said enclosure.

6. The drain pan of claim 1 including a pair of brackets mounted on a side wall of said enclosure for supporting said flexible hose when not in use.

* * * * *